Oct. 27, 1953     J. V. MORRIS     2,657,087
FLORAL DISPLAY ATTACHMENT FOR VEHICLES
Filed July 3, 1950     3 Sheets-Sheet 1

John V. Morris
INVENTOR.

Oct. 27, 1953  J. V. MORRIS  2,657,087
FLORAL DISPLAY ATTACHMENT FOR VEHICLES
Filed July 3, 1950  3 Sheets-Sheet 2
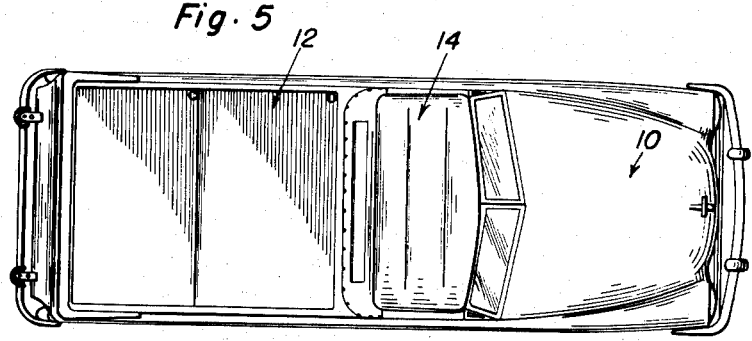
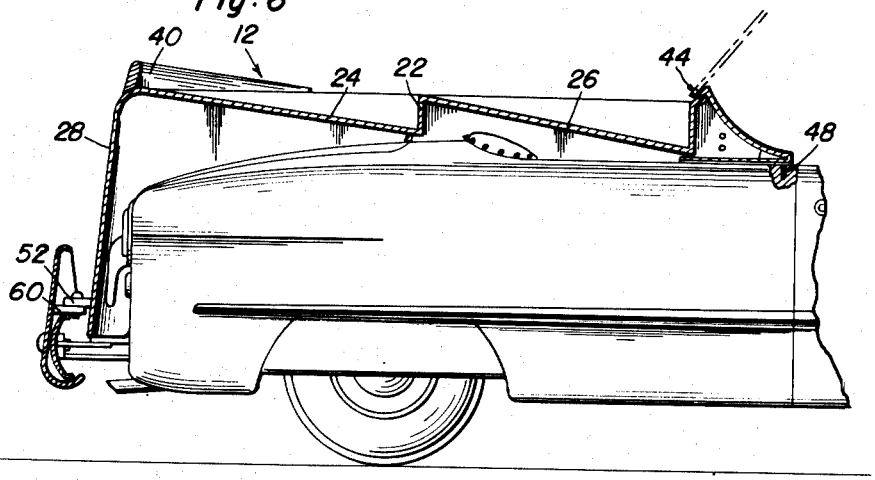
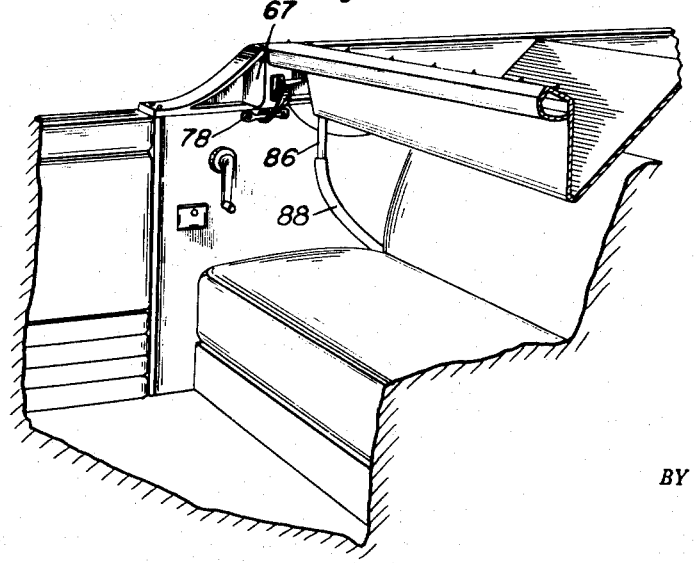
John V. Morris
INVENTOR.

Oct. 27, 1953          J. V. MORRIS          2,657,087
FLORAL DISPLAY ATTACHMENT FOR VEHICLES
Filed July 3, 1950          3 Sheets-Sheet 3
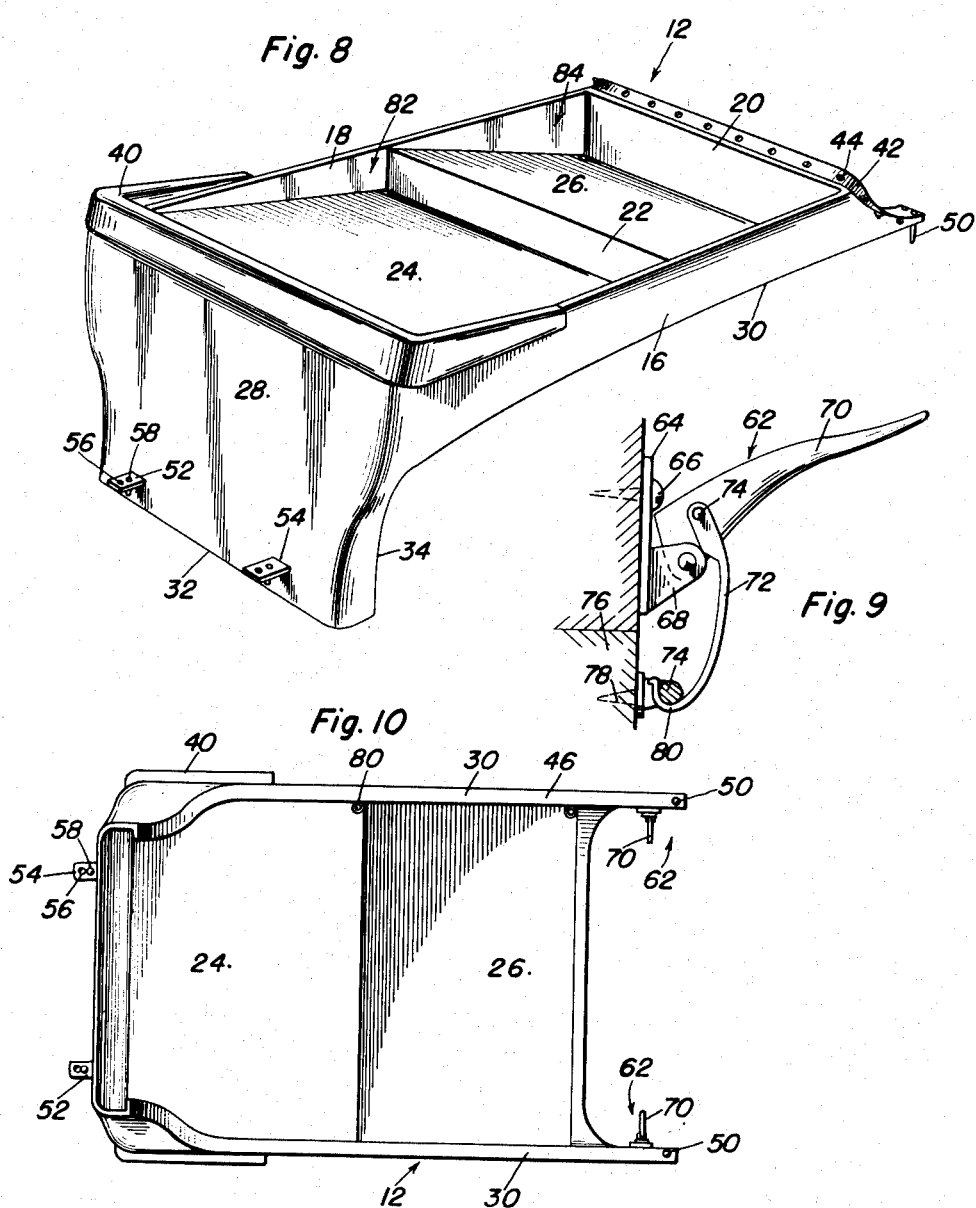
John V. Morris
INVENTOR.

Patented Oct. 27, 1953

2,657,087

UNITED STATES PATENT OFFICE 2,657,087

FLORAL DISPLAY ATTACHMENT FOR VEHICLES

John V. Morris, Plymouth, Pa.

Application July 3, 1950, Serial No. 171,849

4 Claims. (Cl. 296—21)

The present invention relates to improvements in vehicles and more particularly to the provision of an attachment for a conventional convertible vehicle, whereby the conventional convertible vehicle may be transposed into a floral display vehicle.

An object of the present invention is to provide an attachment for conventional convertible automobiles for converting the same into floral display carrying vehicles.

A further object of the present invention is to provide an attachment for vehicles which may easily be attached by two men, and wherein the means for attachment are of simple construction and operation.

Another object of the present invention is to provide a floral display attachment for convertible vehicles wherein the resultant vehicle assumes a custom built appearance, the edges of the attachment being of the contour of the vehicle and giving the vehicle a substantially elongated appearance.

Another object of the present invention is to provide a floral display attachment for convertible vehicles wherein the structure is of integral construction, being readily formed from sheet metal with welded joints, the bottom walls of the attachment being inclined and in conjunction with the side walls forming containers for the floral displays.

The invention also comprises novel details of construction and novel combinations and arrangements of parts, which will more fully appear in the course of the following description. However, the drawings merely show and the following description merely describes embodiments of the present invention, which are given by way of illustration or example only.

The best form in which I have contemplated applying my invention is illustrated in the accompanying drawings, wherein:

Figure 5 is a top plan view of Figure 4;

Figure 6 is a longitudinal transverse sectional view through the attachment with parts broken away;

Figure 7 is a perspective view of the interior of the vehicle showing the clamping arrangement and drainage means for the attachment;

Figure 8 is a perspective view of the floral display attachment;

Figure 9 is a detailed view of the spring clamp employed with the present invention; and, Figure 10 is a bottom plan view of the attachment of the present invention.

Figure 1:
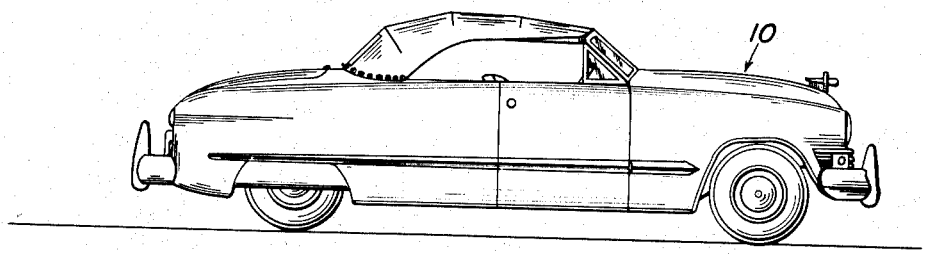
Figure 1 is a side elevational view of a conventional convertible vehicle, the one illustrated being a 1949 Ford convertible.
Figure 2:
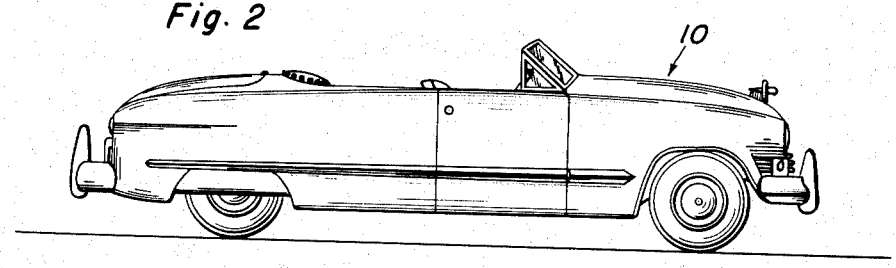
Figure 2 is a side elevational view of the convertible coupe with the top in collapsed position.

Referring more particularly to the drawings, wherein like numerals designate like parts throughout, numeral 10 designates generally the conventional convertible vehicle with which the present invention is employed, numeral 12 designates generally the floral display attachment for the vehicle, and numeral 14 designates generally the convertible top which may be employed in conjunction with the floral display attachment and the conventional convertible vehicle.

Referring now to Figures 6 and 8 of the drawings, the construction of the floral display attachment will be readily understood. The attachment 10 may be formed from sheet metal and includes a pair of side walls 16 and 18, front wall 20, intermediate wall 22, and inclined bottom walls 24 and 26 and an apron portion 28. The various portions of the attachment may be formed from pressing operations and joined together along the seams by welding, or other desired methods.

Figure 3:
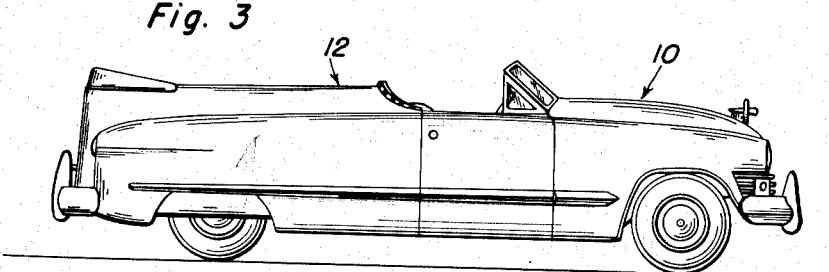
Figure 3 is a side elevational view of the convertible coupe with the attachment for the floral displays mounted thereon.
Figure 4:
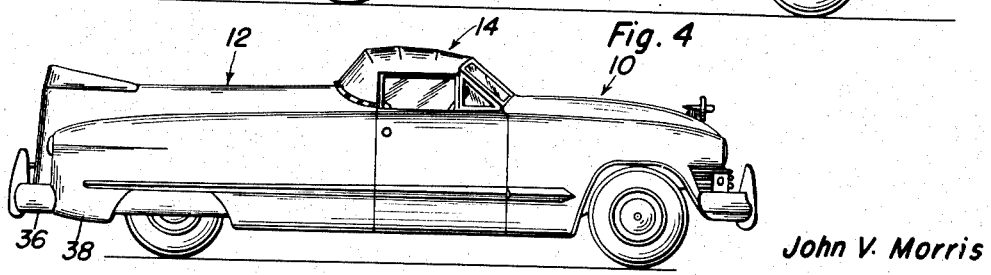
Figure 4 is a view similar to Figure 3 but wherein the cab top is also mounted on the vehicle.

The bottom edges 30 of the side walls 16 and 18 and the horizontal and vertical edges 32 and 34 of the apron 28 are of predetermined contour to fit the exterior of the convertible vehicle, as shown best in Figures 3 and 4. The bottom edge 32 is adapted to be positioned upon the panel between the bumper 36 and body 38 of the vehicle 10.

The attachment 12 is provided with a simulated boot 40 for decorative purposes. The boot may be covered with canvas or leather as desired.

The leading edge 42 of the attachment is provided with a plurality of buttons 44 whereby the convertible top, hereinafter described, may be attached to the floral display attachment.

The means for securing the structure of the present invention to the conventional convertible vehicle includes dowels positioned on the under side of the flange 46 forming the lower edge of the attachment. The vehicle 10 is provided with recesses 48, as shown in Figure 6, for receiving the dowels 50.

The apron portion 28 of the attachment 12 is provided with a pair of brackets 52 and 54 which are each provided with an aperture 56 and dowel 58. The bumper 36 has welded thereto a bracket 60 for cooperation with each of the brackets 54 and 52. It will readily be seen that with the provision of dowels and brackets, the positioning of the attachment will be facilitated and the apron of the attachment may be secured in position by means of bolts through the apertures 56 and brackets 60.

Referring more particularly to Figures 7 and 9, the construction and operation of the spring clamps will be readily understood. The spring clamp is designated generally by the numeral 62, and includes a bracket 64 secured to a block 67 by means of screws 66, a pair of pivot mounting elements 68 fixedly secured to the bracket 64, a lever 70 pivotally mounted on the elements 68, a spring steel clamping element 72 secured to the lever 70 by means of the pin 74, and a footman's loop 74 secured to the inside of the wall 76 of the vehicle by means of the screws 78. The operation of the latch will be readily obvious to one skilled in the art from an examination of the Figure 9. When the lever 70 is pivoted, the hook portion 80 of the spring steel latching element 72 is engaged with the loop 74, and continued movement of the lever 70 in an upward direction causes the pin 74 to reach a past dead center position whereby the latch is in secured position. The resiliency of the spring steel latching element 72 will also effectively maintain the attachment in effective contact with the surface of the vehicle.

The containers 82 and 84 formed by the bottom walls 24 and 26 are each provided with drainage conduits 86 with rubber or plastic hoses 88 leading to a drainage point whereby the containers may be drained.

After the floral display attachment has been positioned on the vehicle, a convertible top 14 may be mounted as shown in Figure 4 of the drawings, if desired. The cab top 14 may be formed from canvas or Leatherette material, and if desired metal sheeting may be employed. The structure is of reinforced construction, employing metal braces as ribs. The top may also be provided with a plurality of eyelets in which may be received the buttons 24 of the attachment.

Some changes may be made in the construction and arrangements of the parts of my device without departing from the real spirit and purpose of my invention, and it is my intention to cover by my claims any modified forms of structure or use of mechanical equivalents which may be reasonably included within their scope without sacrificing any of the advantages thereof.

Having described the invention, what is claimed as new is:

1. A display container for mounting on a convertible vehicle comprising container means including inclined bottom walls, means for removably mounting said container means on a conventional vehicle body including transverse walls and side walls rigidly secured to said container bottom walls, said walls forming closed bottom trays, a rear apron secured to said container side walls, said apron extending over and concealing the rear of said vehicle body, bracket means rigidly attaching said apron to the vehicle, the bottoms of said side walls and the edges of the apron being contoured to merge with the contour of the vehicle body, resilient means clamping said side walls against the vehicle body, drainage conduits connected to said container means at the low points of said inclined bottom walls.

2. A floral display container for mounting on the body of a convertible vehicle comprising a pair of side walls, a transverse front wall rigidly joining the front ends of said side walls, a depending apron joining the rear ends of said side walls, an intermediate transverse wall joined to said side walls, inclined bottom walls connected to said side walls and said transverse walls, said bottom walls with said side and transverse walls forming display trays in said container, the bottom edges of said side walls resting on the body of the vehicle and being contoured to closely fit against the surface of said body, said apron depending over the rear of said vehicle, mounting brackets rigidly securing said apron to the rear bumper of said vehicle.

3. A display attachment for mounting on the body of a convertible vehicle comprising a pair of side walls, a plurality of transverse walls joined to said side walls, inclined bottom walls joined to said side walls and said transverse walls and forming a plurality of inclined closed bottom trays, a depending apron integrally formed with said attachment at its rear end, said apron being adapted to envelop the rear end of the vehicle, clamps mounted adjacent the forward end of said attachment, loops mounted on said vehicle, said clamps including a resilient latch element for engagement with said loop.

4. For use with a convertible vehicle, an attachment for converting the vehicle as a floral display vehicle, said attachment comprising a pair of side walls, a rear apron integrally joining said side walls, a front wall joining said side walls, a continuous bottom wall joined to said side walls and forming display trays in said attachment, the bottom edges of said side walls resting on the body of the vehicle and being contoured to closely fit against the surface of said body, said apron depending over the rear of said vehicle, mounting brackets secured to the bumper of said vehicle, complementary brackets attached to said apron, said brackets being rigidly joined together to position said attachment on said vehicle.

JOHN V. MORRIS.

References Cited in the file of this patent

UNITED STATES PATENTS

| Number | Name | Date |
|--------|------|------|
| 693,591 | Draper | Feb. 18, 1902 |
| 962,231 | Macy | June 21, 1910 |
| 1,325,353 | Day, Jr. | Dec. 16, 1919 |
| 1,420,298 | White | June 20, 1922 |
| 1,757,194 | Howe | May 6, 1930 |
| 1,984,681 | Jackson | Dec. 18, 1934 |
| 2,268,881 | Le Boeuf | Jan. 6, 1942 |

FOREIGN PATENTS

| Number | Country | Date |
|--------|---------|------|
| 696,362 | France | Oct. 14, 1930 |